United States Patent
Luo et al.

(10) Patent No.: US 7,689,011 B2
(45) Date of Patent: Mar. 30, 2010

(54) EXTRACTING FEATURES FROM FACE REGIONS AND AUXILIARY IDENTIFICATION REGIONS OF IMAGES FOR PERSON RECOGNITION AND OTHER APPLICATIONS

(75) Inventors: Huitao Luo, Fremont, CA (US); Tong Zhang, Palo Alto, CA (US); Daniel Tretter, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 855 days.

(21) Appl. No.: 11/527,239

(22) Filed: Sep. 26, 2006

(65) Prior Publication Data

US 2008/0075336 A1    Mar. 27, 2008

(51) Int. Cl.
    *G06K 9/00*    (2006.01)
    *G06K 9/46*    (2006.01)
(52) U.S. Cl. .................. 382/118; 382/162; 382/190
(58) Field of Classification Search ................ 382/118, 382/305, 237, 170, 190, 199, 194, 195, 203, 382/266, 162; 345/622; 348/26; 375/17.002; 250/221, 216, 200; 283/75, 74, 72, 94
See application file for complete search history.

(56) References Cited

U.S. PATENT DOCUMENTS

| | | | | |
|---|---|---|---|---|
| 4,045,883 A | * | 9/1977 | Ryan | 434/155 |
| 5,867,150 A | * | 2/1999 | Bricklin et al. | 345/173 |
| 5,933,529 A | * | 8/1999 | Kim | 382/199 |
| 6,184,926 B1 | * | 2/2001 | Khosravi et al. | 348/239 |
| 6,263,113 B1 | | 7/2001 | Abdel-Mottaleb et al. | |
| 6,611,613 B1 | * | 8/2003 | Kang et al. | 382/118 |
| 2003/0107592 A1 | | 6/2003 | Li et al. | |
| 2003/0154084 A1 | | 8/2003 | Li et al. | |
| 2004/0264810 A1 | | 12/2004 | Taugher et al. | |
| 2006/0140455 A1 | | 6/2006 | Costache | |
| 2006/0251339 A1 | * | 11/2006 | Gokturk et al. | 382/305 |
| 2006/0253491 A1 | * | 11/2006 | Gokturk et al. | 707/104.1 |
| 2008/0273761 A1 | * | 11/2008 | Kawata | 382/115 |

FOREIGN PATENT DOCUMENTS

WO    WO 2006080755    8/2006

OTHER PUBLICATIONS

W. Zhao et al., "Face Recognition: A Literature Survey," ACM Computing Surveys, 2003, pp. 399-458.
SK Nayar and RM Bolle, "Reflectance Based Object Recognition." International Journal of Computer Vision, 17(3):219-240, 1996.

(Continued)

*Primary Examiner*—Sheela C Chawan

(57) ABSTRACT

Method, apparatus, and systems for extracting features from face regions and auxiliary identification regions of images are described. In one aspect, a face region containing at least a portion of a person's face is detected in an input image. An auxiliary identification region outside the face region is identified in the input image. Facial features characterizing the face region are determined. Auxiliary identification features characterizing the auxiliary identification region are calculated. An indexing datum is derived from the facial features and the auxiliary identification features. The indexing datum is stored in association with the input image.

20 Claims, 5 Drawing Sheets

OTHER PUBLICATIONS

Michael J. Swain, "Color Indexing," Int'l J. of Computer Vision, vol. 7, No. 1, pp. 11-32 (1991).

Jie Yang et al., Multimodal People ID for a Multimedia Meeting Browser, Proceedings of ACM Multimedia, pp. 159-168, 1999.

I. Craw et al. "How should we represent faces for automatic recognition?," IEEE Trans. Pattern Anal. Machine Intell., vol. 21, pp. 725-736, Aug. 1999.

A. Del Bimbo et al., Visual querying by color perceptive regions, Proc. 2nd Int'l Conf. on Visual Information Systems, San Diego, pp. 125-131, Dec. 1997.

L. Lee and G. Dailey. Learning pedestrian models for silhouette refinement. In Proc. of International Conf. on Computer Vision, pp. 663-670, 2003.

Udo Mahlmeister et al., "Color-Orientation Indexing," DAGM-Symposium, pp. 3-10 (1996).

Jing Huang et al., "Spatial color indexing and applications," Sixth International Conference on Computer Vision, pp. 602-607 (1998.).

Nicu Sebe et al., "Robust Color Indexing," Proc. of ACM Multimedia'99, Orlando, Florida, vol. 1, pp. 239-242 (1999).

S. Feyrer et al., "Detection, Tracking, and Pursuit of Humans with an Autonomous Mobile Robot," Intl Conf. Intelligent Robots & Systems 1999, Kyongju, Korea, pp. 864-869,1999.

Longbin Chen et al, "Face annotation for family photo management" Intl Jrnl of Image and Graphics, World Scientific Publishing Co., V.3(1), 2002.

* cited by examiner

EXTRACTING FEATURES FROM FACE REGIONS AND AUXILIARY IDENTIFICATION REGIONS OF IMAGES FOR PERSON RECOGNITION AND OTHER APPLICATIONS

BACKGROUND

Face recognition techniques oftentimes are used to locate, identify, or verify one or more persons appearing in images in an image collection. In a typical face recognition approach, faces are detected in the images; the detected faces are normalized; features are extracted from the normalized faces; and the identities of persons appearing in the images are identified or verified based on comparisons of the extracted features with features that were extracted from faces in one or more query images or reference images. Many automatic face recognition techniques can achieve modest recognition accuracy rates with respect to frontal images of faces that are accurately registered. When applied to other facial views or to poorly registered facial images, however, these techniques fail to achieve acceptable recognition accuracy rates.

What are needed are systems and methods that are capable of recognizing persons in images even with respect to non-frontal images of faces and poorly registered facial images.

SUMMARY

In one aspect, the invention features a method in accordance with which a face region containing at least a portion of a person's face is detected in an input image. An auxiliary identification region outside the face region is identified in the input image. Facial features characterizing the face region are determined. Auxiliary identification features characterizing the auxiliary identification region are calculated. An indexing datum is derived from the facial features and the auxiliary identification features. The indexing datum is stored in association with the input image.

The invention also features a system for implementing the method described above, and an apparatus that is configured to cause a machine to implement the method described above.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Introduction

The embodiments that are described in detail herein recognize persons in images based on features that are extracted from facial regions and auxiliary identification regions of the images. In many image collections, especially personal image collections that are maintained by consumers, images tend to be grouped by events during each of which persons appearing in the images tend to be associated with similar patterns. For example, during a particular event, persons tend to wear the same clothes and the same accessories (scarves, ties, necklaces) and have the same hair color and style. In these cases, it is expected that the embodiments that are described herein will achieve improved recognition results even with respect to non-frontal images of faces and poorly registered facial images.

II. Exemplary Embodiment of a First Image Processing System and Its Components

A. Overview of the First Image Processing System

Figure 1:
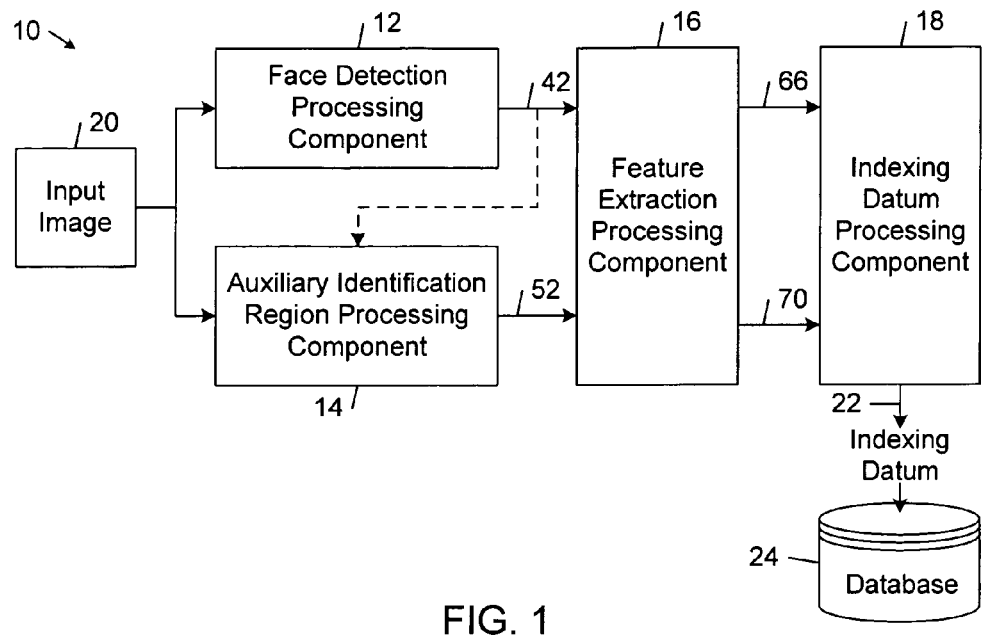
FIG. 1 is a block diagram of an embodiment of an image processing system.

FIG. 1 shows an embodiment of an image processing system 10 that includes a face detection processing component 12, an auxiliary identification region processing component 14, a feature extraction processing component 16, and an indexing datum processing component 18.

In operation, the image processing system 10 processes an input image 20 to generate an indexing datum 22, which is stored in a database 24 in association with the input image 20. In some embodiments, each input image is associated with a respective indexing datum for each face that is detected in the input image. Thus, in these embodiments, input images that contain multiple detected faces are associated with multiple indexing data sets, where each indexing datum corresponds to a different respective face that is detected in the associated input image. The input image 20 may correspond to any type of image, including an original image (e.g., a video keyframe, a still image, or a scanned image) that was captured by an image sensor (e.g., a digital video camera, a digital still image camera, or an optical scanner) or a processed (e.g., sub-sampled, filtered, reformatted, enhanced or otherwise modified) version of such an original image. The indexing datum 22 is any type of information that identifies, characterizes, or otherwise represents the input image 20 in a way that can be compared to one or more query or search criteria. In some embodiments, the image processing system 10 stores the indexing datum 22 in a header (e.g., an EXIF header) of the input image 20. In other embodiments, the image processing system 10 stores the indexing datum 22 in a separate data structure that is linked to the input image 20.

Figure 2:
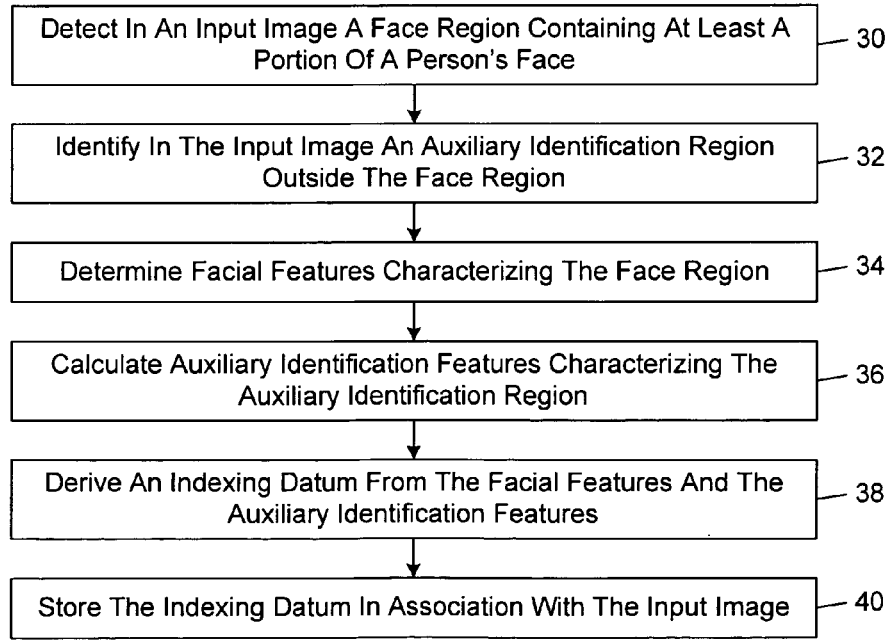
FIG. 2 is a flow diagram of an embodiment of an image processing method.

FIG. 2 shows an embodiment of a method that is implemented by an embodiment of the image processing system 10. In accordance with this method, the face detection processing component 12 detects in the input image 20 a face region containing at least a portion of a person's face (FIG. 2, block 30). The auxiliary identification region processing component 14 identifies in the input image 20 an auxiliary identification region outside the face region (FIG. 2, block 32). The feature extraction processing component 16 determines facial features characterizing the face region (FIG. 2, block 34). The feature extraction processing component 16 also calculates auxiliary identification features characterizing the auxiliary identification region (FIG. 2, block 36). The indexing datum processing component 18 derives an indexing datum from the facial features and the auxiliary identification features (FIG. 2, block 38). In some embodiments, the indexing datum processing component 18 is operable to derive the indexing datum from only one of the facial features and the auxiliary identification features under certain specified conditions. For example, in some of these embodiments, the indexing datum processing component 18 determines when the facial features are not reliable or otherwise unavailable and, in response to such a determination, the indexing datum processing component 18 derives the indexing datum from only the auxiliary identification features. After the indexing datum has been derived, the indexing datum processing component 18 stores the indexing datum in association with the input image in the database 24 (FIG. 2, block 40).

In general, the image processing system 10 may be implemented by one or more discrete processing components (or modules) that are not limited to any particular hardware, firmware, or software configuration. In the illustrated embodiment, the processing components 12-18 may be implemented in any computing or data processing environment, including in digital electronic circuitry (e.g., an application-specific integrated circuit, such as a digital signal processor (DSP)) or in computer hardware, firmware, device driver, or software. In other embodiments, the functionalities of multiple ones of the processing components 12-18 are combined into a single processing component. In still other embodiments, the respective functionalities of each of one or more of the processing components 12-18 are performed by a respective set of multiple processing components.

In some implementations, computer process instructions for implementing the methods that are executed by the image processing system 10 and the data it generates are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

B. Exemplary Embodiments of the Face Detection Processing Components

As explained above, the face detection processing component 12 detects faces in the input image 20. In general, the face detection processing component 12 may use any type of face detection process that determines the presence and location of each face in the input image 20. Exemplary face detection methods include but are not limited to feature-based face detection methods, template-matching face detection methods, neural-network-based face detection methods, and image-based face detection methods that train machine systems on a collection of labeled face samples. An exemplary feature-based face detection approach is described in Viola and Jones, "Robust Real-Time Object Detection," Second International Workshop of Statistical and Computation theories of Vision-Modeling, Learning, Computing, and Sampling, Vancouver, Canada Jul. 13, 2001), which is incorporated herein by reference. An exemplary neural-network-based face detection method is described in Rowley et al., "Neural Network-Based Face Detection," IEEE Transactions on Pattern Analysis and Machine Intelligence, Vol. 20, No. 1 (January 1998), which is incorporated herein by reference.

In a typical face detection process, the face detection processing component 12 initially determines the presence and rough location of each face in the input image 20. After the rough location of a face has been detected, the face detection processing component 12 aligns (or registers) the detected face so that it can be recognized. In this process, one or more feature points in the detected face (e.g., the eyes, the nose tip, and the mouth or lips) are extracted. In general, any type of feature extraction process may be used including but not limited to edge, line and curve based feature extraction methods, extraction methods based on templates that are designed to detect specific features points (e.g., the eyes and mouth), and structural matching methods. For each detected face, the face detection processing component 12 aligns the extracted features in relation to a respective facial bounding box encompassing some or all portions of the detected face. In some implementations, the facial bounding box corresponds to a rectangle that includes the eyes, nose, mouth but not the entire forehead or chin or top of head of a detected face.

The face detection processing component 12 outputs one or more facial parameter values 42. Exemplary types of facial parameter values 42 include the number of faces, the locations of the facial bounding boxes, and the sizes (i.e., the dimensions) of the facial bounding boxes. The face detection processing component 12 passes the facial parameter values 42 to the feature extraction processing component 16. In some embodiments, the face detection processing component 12 also passes the facial parameter values 42 to the auxiliary identification region processing component 14, as shown in FIG. 1.

C. Exemplary Embodiment of the Auxiliary Identification Region Process Component As explained above, the auxiliary identification region processing component 14 identifies in the input image 20 an auxiliary identification region outside the face region. In general, the auxiliary identification region processing component 14 attempts to identify regions of the input image 20 that are outside of the face region and are likely to contain features that remain constant during the same event (e.g., a birthday party, a wedding, a picnic), which typically is confined within narrow spatio-temporal bounds. In some embodiments, the auxiliary identification region processing component 14 identifies the location and dimensions of the auxiliary identification region as a function of the location and dimensions of facial bounding box that are reported in the facial parameter values 42 that are output by the face detection processing component 12.

Figure 3:
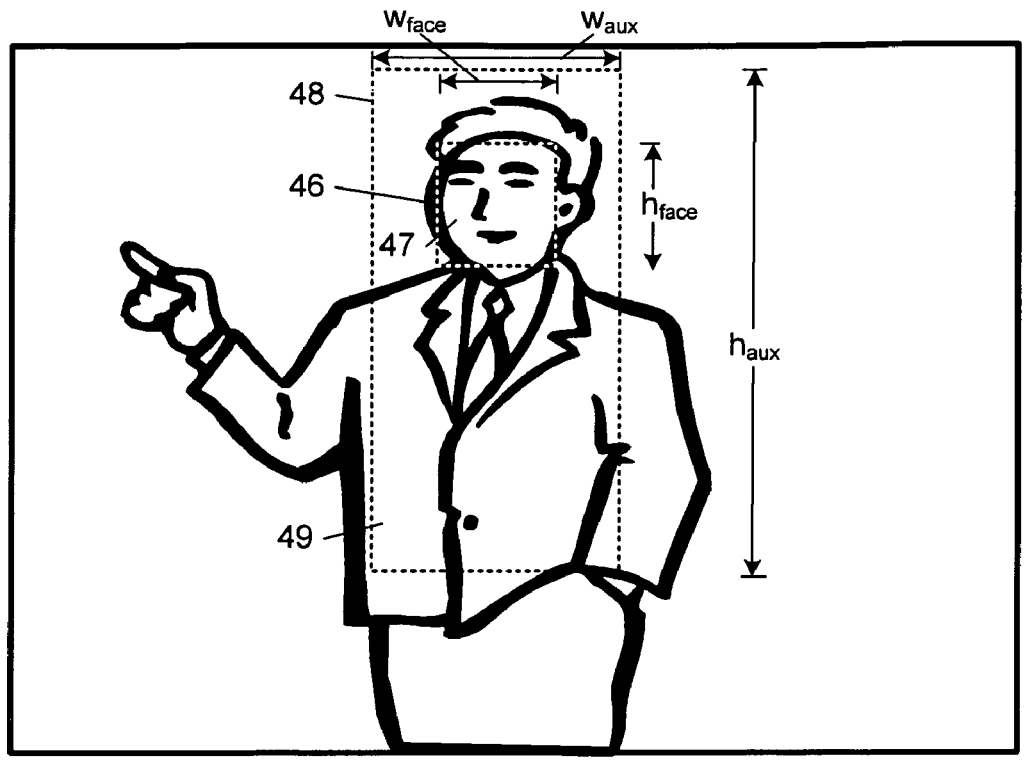
FIG. 3 is a diagrammatic view of an exemplary input image over which are superimposed a boundary demarcating an embodiment of a face region and a boundary demarcating an embodiment of an auxiliary identification region.

FIG. 3 shows an exemplary input image 44 over which are superimposed a boundary 46 demarcating an embodiment of a face region 47 and a boundary 48 demarcating an embodiment of an auxiliary identification region 49. In this embodiment, the auxiliary identification region processing component 14 has selected a region of the input image 44 surrounding the face region 47 as the auxiliary identification region 49. In some embodiments, the height ($h_{aux}$) and width ($w_{aux}$) of the auxiliary identification region 49 are functions of the corresponding dimensions ($h_{face}$, $w_{face}$) of the face region 47. For example, in the illustrated embodiment, the dimensions of the auxiliary identification region 49 are given by:

$$h_{aux} = k_{height} \cdot h_{face} \quad (1)$$

$$w_{aux} = k_{width} \cdot w_{face} \quad (2)$$

where $k_{height}$ and $k_{width}$ are scalar constants, which may be determined empirically. In the illustrated embodiment, the location of the top side of the auxiliary identification region 49 is located above the top side of the face region 47 by a distance that is equal to the distance between the top side of the face region and the vertical (i.e., along the height dimension) location of the eyes. In this embodiment, the left and right sides of the auxiliary identification region 49 are located symmetrically with respect to the left and right sides of the face region 47.

Figure 4:
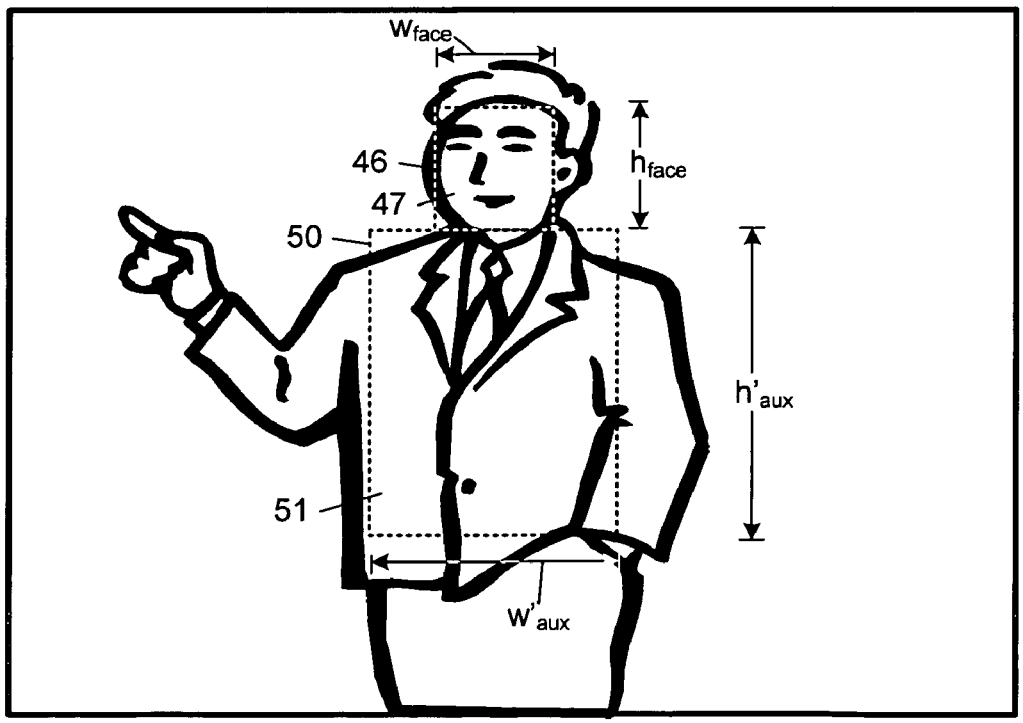
FIG. 4 is a diagrammatic view of an exemplary input image over which are superimposed a boundary demarcating an embodiment of a face region and a boundary demarcating an embodiment of an auxiliary identification region.

FIG. 4 shows the exemplary input image 44 over which are superimposed the boundary 46 demarcating the face region 47 and a boundary 50 demarcating an embodiment of an auxiliary identification region 51. In this embodiment, the auxiliary identification region processing component 14 has selected a region of the input image 44 below and adjacent to the face region 47 as the auxiliary identification region 51. In some embodiments, the height ($h'_{aux}$) and width ($w'_{aux}$) of the auxiliary identification region 51 are functions of the corresponding dimensions ($h_{face}$, $w_{face}$) of the face region 47. For example, in the illustrated embodiment, the dimensions of the auxiliary identification region 51 are given by:

$$h'_{aux} = k'_{height} \cdot h_{face} \quad (3)$$

$$w'_{aux} = k'_{width} \cdot w_{face} \quad (4)$$

where $k'_{height}$ and $k'_{width}$ are scalar constants, which may be determined empirically. In the illustrated embodiment, the location of the top side of the auxiliary identification region 51 coincides with the bottom side of the face region 47, and the left and right sides of the auxiliary identification region 51 are located symmetrically with respect to the left and right sides of the face region 47.

The auxiliary identification region processing component 14 outputs one or more auxiliary parameter values 52 (see FIG. 1). Exemplary types of auxiliary parameter values 52 include the number of auxiliary identification regions, the locations of the bounding boxes of the auxiliary identification regions, and the sizes (i.e., the dimensions) of the auxiliary identification region bounding boxes. The auxiliary identification region processing component 14 passes the auxiliary identification region parameter values 52 to the feature extraction processing component 16, as shown in FIG. 1.

D. Exemplary Embodiments of the Feature Extraction Processing Component

In general, any type of facial feature extraction process may be used to extract features from the detected face regions that are reported in the facial parameter values 42 that are output by the face detection processing component 12. Exemplary facial feature extraction processes include, but are not limited to: edge, line and curve based feature extraction methods; extraction methods based on templates that are designed to detect specific features points (e.g., the eyes and mouth); and structural matching methods. In some embodiments a principle component analysis (PCA) is used to decompose the feature space into a low-dimension subspace spanned by the first few eigenvectors, and a subspace orthogonal to the eigenvector space.

In general, any type of object recognition feature extraction process may be used to extract features from the auxiliary identification regions that are reported in the auxiliary parameter values 52 that are output by the auxiliary identification region processing component 14. In some embodiments, each of the auxiliary identification regions is represented by a set of low-level image features (e.g., color features, texture features, shape and layout features) that are automatically extracted by the feature extraction processing component 16. Exemplary object recognition features that are extracted by the feature extraction processing component 16 include, but are not limited to: color histogram features; filtered color histogram features; color correlogram features; wavelet texture features; and photometric invariant features.

In some embodiments, the feature extraction processing component 16 determines a color histogram for each auxiliary identification region by discretizing (or quantizing) the color space into a number of bins and counting the number of pixels of the auxiliary identification region that are in each bin. These counts constitute the color histogram features representing the auxiliary identification region.

In some embodiments, the feature extraction processing component 16 determines color correlogram features by building a table that is indexed by color pairs (i, j), where the $k^{th}$ entry specifies the probability of finding a pixel of color k at a distance k from a pixel of color i. Additional details regarding the process of building the color correlogram and using it for indexing and comparison can be found in Jing Huang et al., "Spatial Color Indexing and Applications", International Journal of Computer Vision, vol. 35, no. 3, pp. 245-268 (1999), which is incorporated herein by reference.

In some embodiments, the feature extraction processing component 16 determines wavelet texture features for each auxiliary identification region by applying a wavelet transform (e.g., a Daubechies wavelet transform) to the auxiliary identification region. The frequency bands of the resulting decomposition of the auxiliary identification region are processed to obtain a texture image. In some embodiments, the feature extraction processing component 16 calculates one or more moment-based measures of shape (e.g., normalized central moments) from the texture image. These moment-based measure correspond to the wavelet texture features.

In some embodiments, the feature extraction processing component 16 determines saliency measures describe saliency features (e.g., texture, edges, corners, and other structural elements) in the auxiliary identification region. In some embodiments, the feature extraction processing component 16 derives the saliency features by applying one or more saliency feature descriptor functions to respective ones of the auxiliary identification regions. In general, any one or more of a wide variety of different types of saliency feature descriptors may be used to describe the texture of the auxiliary identification regions. The saliency feature descriptors may be statistical, structural, or syntactic. Exemplary types of saliency feature descriptors include: the level of contrast in the auxiliary identification regions; the magnitude (amplitude) of pixel values in the auxiliary identification regions; the energy of pixel values in the auxiliary identification regions; the standard deviation of pixel values in the auxiliary identification regions; the skewness of the gradient value distribution in the auxiliary identification regions; and the edge frequency in the auxiliary identification regions. The saliency feature descriptors may be applied to individual pixels, local regions (e.g., block of 5×5 pixels), or all of the pixels of the auxiliary identification regions.

In some embodiments, each of the saliency features describes a respective level of contrast in the corresponding auxiliary identification region. In these embodiments, the corresponding auxiliary identification region is passed through a high-pass spatial filter and the contrast level corresponds to a count of the pixels in the high-pass filter output that are above a specified threshold.

In other embodiments, each of the saliency features describes a respective edge frequency in the corresponding auxiliary identification region. In these embodiments, the feature extraction processing component 16 may use any type of edge detection technique to find edges in the auxiliary identification regions. In one exemplary embodiment, the feature extraction processing component 16 uses a Sobel edge detector to compute edge directions and magnitudes. The Sobel edge detector uses a pair of 3×3 convolution masks to perform a two-dimensional gradient measurement on the local images 31, where one of the convolution masks estimates the gradient in the x-direction (columns) and the other convolution mask estimates the gradient in the y-direction (rows).

In some embodiments, the feature extraction processing component 16 determines photometric invariant features from each auxiliary identification region. In this process, the feature extraction processing component 16 computes photometric invariant features from pairs of neighboring pixels ($\vec{x}_1, \vec{x}_2$) in the auxiliary identification region for each color channel. In one exemplary embodiment, the following photometric invariant features $F_R$, $F_G$, $F_B$ are computed by the feature extraction processing component 16:

$$F_R = \frac{R(\vec{x}_1) - R(\vec{x}_2)}{R(\vec{x}_1) + R(\vec{x}_2)} \quad (5)$$

$$F_G = \frac{G(\vec{x}_1) - G(\vec{x}_2)}{G(\vec{x}_1) + G(\vec{x}_2)} \quad (6)$$

$$F_B = \frac{B(\vec{x}_1) - B(\vec{x}_2)}{B(\vec{x}_1) + B(\vec{x}_2)} \quad (7)$$

where $R(\vec{x}_i)$ is the red color value of pixel $\vec{x}_i$ (I∈{1,2}), $G(\vec{x}_i)$ is the green color value of pixel $\vec{x}_i$, and $B(\vec{x}_i)$ is the blue color value of pixel $\vec{x}_i$. In another exemplary embodiment, the following photometric invariant features $F_{RG}$, $F_{GB}$, $F_{BR}$ are computed by the feature extraction processing component 16:

$$F_{RG} = \frac{R(\vec{x}_1)G(\vec{x}_2) - R(\vec{x}_2)G(\vec{x}_1)}{R(\vec{x}_1)G(\vec{x}_2) + R(\vec{x}_2)G(\vec{x}_1)} \quad (8)$$

$$F_{GB} = \frac{B(\vec{x}_1)G(\vec{x}_2) - B(\vec{x}_2)G(\vec{x}_1)}{B(\vec{x}_1)G(\vec{x}_2) + B(\vec{x}_2)G(\vec{x}_1)} \quad (9)$$

$$F_{BR} = \frac{R(\vec{x}_1)B(\vec{x}_2) - R(\vec{x}_2)B(\vec{x}_1)}{R(\vec{x}_1)B(\vec{x}_2) + R(\vec{x}_2)B(\vec{x}_1)} \quad (10)$$

Figure 5:
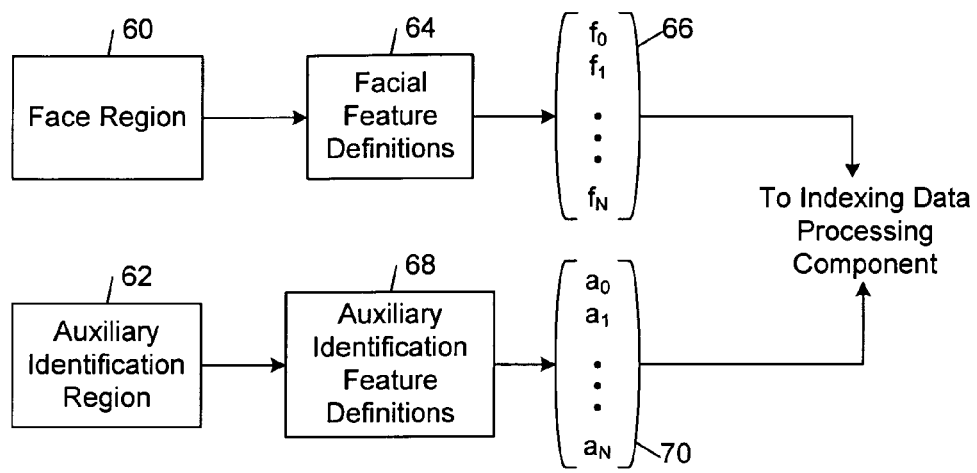
FIG. 5 is a diagrammatic view of an embodiment of a process of extracting features from a face region and its associated auxiliary identification region.

FIG. 5 shows an embodiment of a process that is implemented by an embodiment of the feature extraction processing component 16 to extract features from a detected face region 60 and its associated auxiliary identification region 62.

In accordance with this process, facial feature values ($f_0, f_1, \ldots, f_N$) are extracted from the face region 60 in accordance with a set of facial feature definitions 64. Each facial feature definition corresponds to a rule that describes how to compute or measure a respective facial feature value ($f_0, f_1, \ldots, f_N$). Each feature value reflects the contribution of the corresponding facial feature to the representation of the face region 60 in the feature space spanned by the set of facial features 64. The set of facial feature values that are computed for the face region 60 constitutes a facial feature vector 66.

Analogously, auxiliary identification feature values ($a_0, a_1, \ldots, a_M$) are extracted from the auxiliary identification region 62 in accordance with a set of image content feature definitions 68. Each image content feature definition corresponds to a rule that describes how to compute or measure a respective auxiliary identification feature value ($a_0, a_1, \ldots, a_M$). Each feature value reflects the contribution of the corresponding auxiliary identification feature to the representation of the auxiliary identification region 62 in the feature space spanned by the set of facial features 68. The set of auxiliary identification feature values that are computed for the auxiliary identification region 62 constitutes an auxiliary identification feature vector 70.

The feature extraction processing component 16 passes the facial feature vector 66 and the auxiliary identification feature vector 70 to the indexing datum processing component 18, as shown in FIG. 5.

E. Exemplary Embodiments of the Indexing Datum Processing Component

In general, the indexing datum processing component 18 processes the facial feature values ($f_0, f_1, \ldots, f_N$) and the auxiliary identification feature values ($a_0, a_1, \ldots, a_M$) into an indexing datum 22 that represents the characteristics of the face and auxiliary identification regions of the input image 20 in a way that can be compared to one or more query or search criteria.

In some embodiments, the indexing datum processing component 18 derives the indexing datum 22 (ID) from the facial features and the auxiliary identification features by concatenating the feature vectors 66, 70 that are received from the feature extraction processing component 16, as shown in equation (11):

$$ID = (f_0, f_1, \ldots, f_N, a_0, a_1, \ldots, a_M) \quad (11)$$

Figure 6:
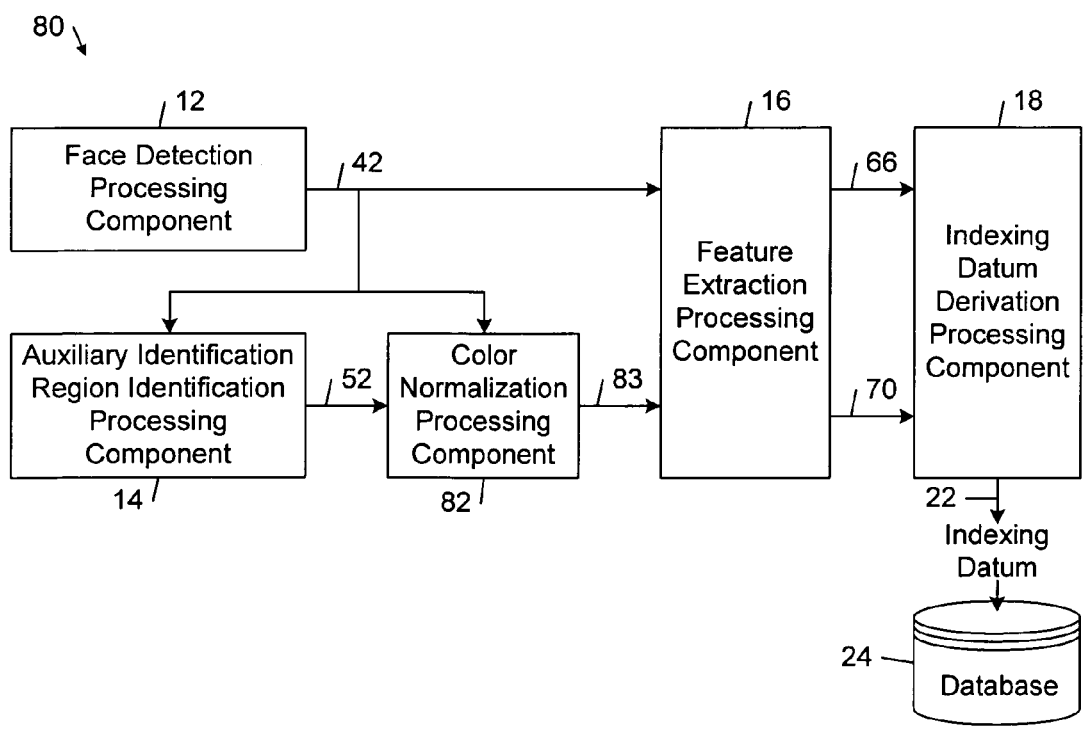
FIG. 6 is a block diagram of an embodiment of an image processing system.

III. Exemplary Embodiment of a Second Image Processing System and its Components FIG. 6 shows an embodiment of an image processing system 80 that corresponds to the imaging processing system 10 that is shown in FIG. 1, except that the image processing system 80 additionally includes a color normalization processing component 82. The color normalization processing component 82 color normalizes the auxiliary identification region and passes a color-normalized version 83 of the auxiliary identification region to the feature extraction processing component 16.

Figure 7:
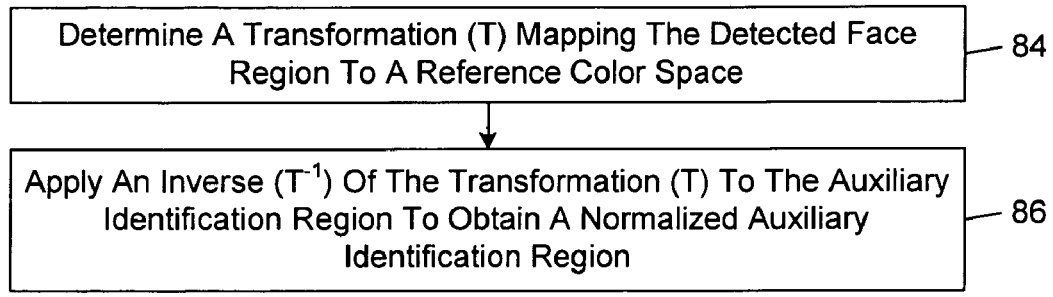
FIG. 7 is a flow diagram of an embodiment of a color normalization method.

FIG. 7 shows an embodiment of a method that is implemented by the color normalization processing component 82 to normalize an auxiliary identification region with respect to a mapping of its associated face region into a reference color space. In accordance with this method, the color normalization processing component 82 determines a transformation (T) that maps the detected face region to the reference color space (FIG. 7, block 84). The relationship between the detected face region and the reference color space is expressed mathematically in equation (12):

$$\begin{bmatrix} R_f \\ G_f \\ B_f \end{bmatrix} = T \cdot \begin{bmatrix} R_{ref} \\ G_{ref} \\ B_{ref} \end{bmatrix} \quad (12)$$

where $R_f$, $G_f$, and $B_f$ represent the color values of the pixels of the face region in the original RGB color space, and $R_{ref}$, $G_{ref}$, and $B_{ref}$ represent the color values in a reference color space. In some embodiments, the reference color space is determined from the color values of a collection of face region samples. The coefficients of the transformation T may be determined using a linear optimization process.

In the illustrated embodiment, the transformation T is a 3×3 matrix of nine coefficients. In some embodiments, the transformation T is reduced to a diagonal matrix, in which case the reference color space is modeled by a single point in the RGB color space. In some of these embodiments, the single RGB point corresponds to the respective means of the R, G, and B values of a collection of face region samples.

The color normalization processing component 82 applies an inverse ($T^{-1}$) of the transformation (T) to the auxiliary identification region to obtain the normalized auxiliary region 83 (FIG. 7, block 86). This process is expressed mathematically in equation (13):

$$\begin{bmatrix} \hat{R}_{aux} \\ \hat{G}_{aux} \\ \hat{B}_{aux} \end{bmatrix} = T^{-1} \cdot \begin{bmatrix} R_{aux} \\ G_{aux} \\ B_{aux} \end{bmatrix} \quad (13)$$

where $R_{aux}$, $G_{aux}$, and $B_{aux}$ represent the color values of the pixels of the auxiliary identification region in the original RGB color space, and $\hat{R}_{aux}$, $\hat{G}_{aux}$, and $\hat{B}_{aux}$ represent the normalized color values of the pixels of the auxiliary identification region.

The color normalization processing component 82 passes the color-normalized auxiliary identification region 83 to the feature extraction processing component 16, which calculates features from the normalized auxiliary identification region in accordance with one or more of the auxiliary identification feature extraction methods described above.

Figure 8:
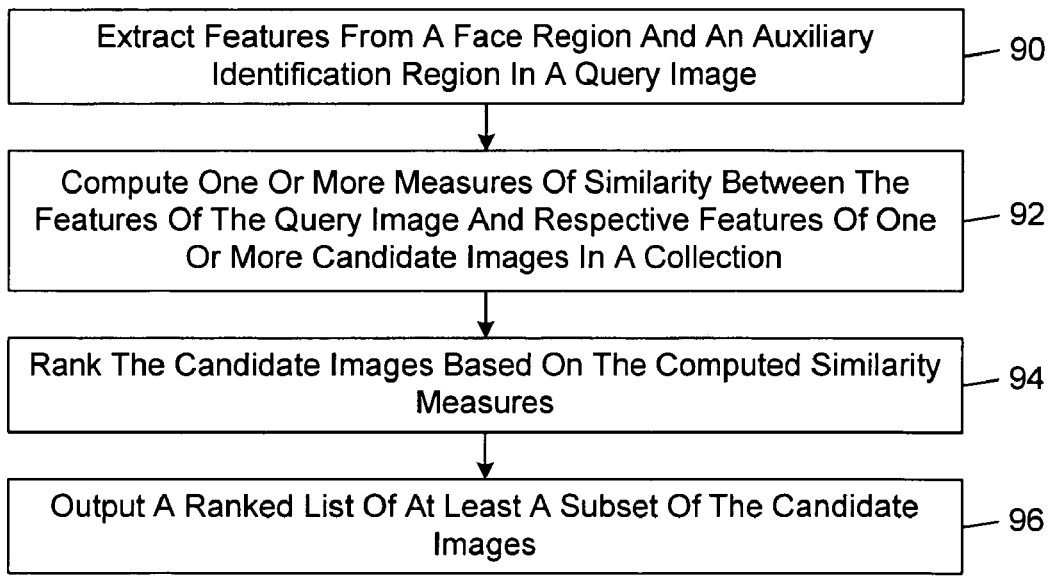
FIG. 8 is a flow diagram of an embodiment of a person recognition based image retrieval method.

IV. Exemplary Application Environments for the Image Processing System Embodiments FIG. 8 shows an exemplary embodiment of a person recognition method that is implemented by an image retrieval system to identify candidate images in a collection that are associated with the indexing data 22. In accordance with this method, features are extracted from a face region and an associated auxiliary identification region of a query image (FIG. 8, block 90). The face region and the auxiliary identification region may be determined using any of the methods described above in §§ II.B and II.C.

One or more measures of similarity between the features of the query image and respective features of one or more candidate images in the collection are computed (FIG. 8, block 92). In some embodiments, the similarity measures correspond to distances between the corresponding features of the query image and each of the candidate images in the collection. For example, in some embodiments, the distance between color histogram features corresponds to the color histogram difference between the query image and each candidate image. The color histogram difference is defined as:

$$\text{diff}_{Ci} = \sum_{n=1}^{K} |\text{hist}_Q(n) - \text{hist}_{Ci}(n)| \quad (11)$$

where $\text{hist}_Q$ and $\text{hist}_{Ci}$ are the histogram of the query image and the histogram of the $i^{th}$ candidate image, respectively, and the parameter K is the number of bins in the histograms. In some embodiments, a color consistency similarity measure is used with respect to the photometric invariant features described above. In some embodiments, an overall similarity value is determined for each candidate image from a weighted combination of the computed similarity measures.

The candidate images are ranked based on the computed similarity measures (FIG. 8, block 94). The candidate images typically are ranked in order from the candidate image most similar to the query image to the candidate image least similar to the query image. A ranked list of at least a subset of the candidate images is output by the image retrieval system (FIG. 8, block 96). The list may be in the form of a list of image names or a set of thumbnail versions of the candidate images.

Figure 9:
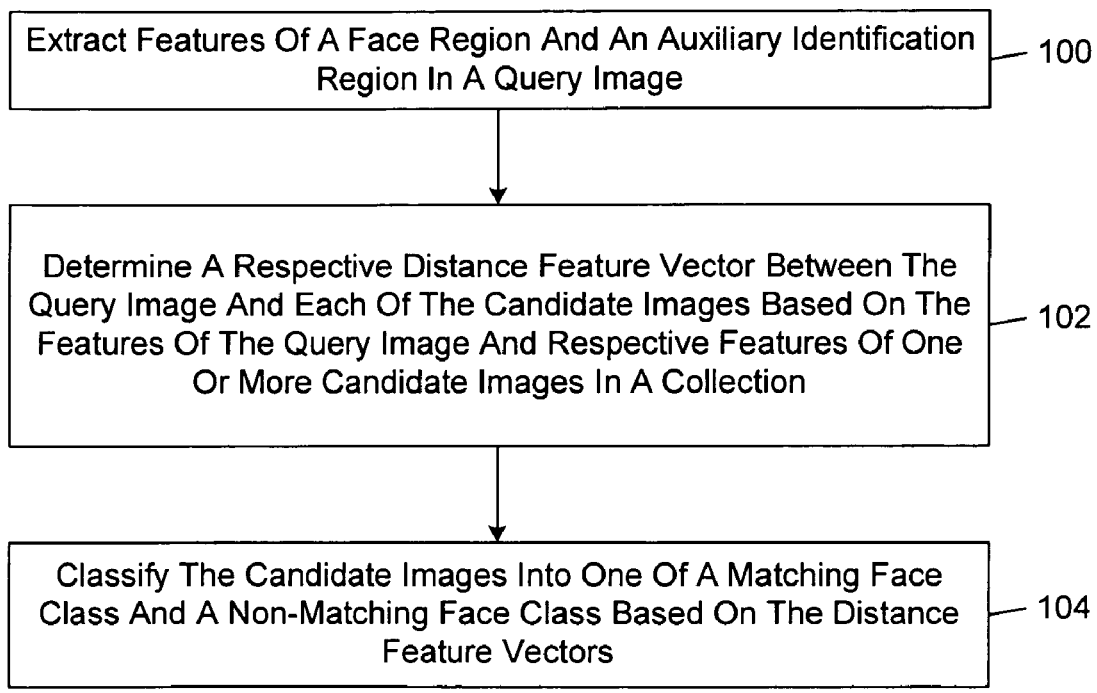
FIG. 9 is a flow diagram of an embodiment of a person recognition based image retrieval method.

FIG. 9 shows an embodiment of a person recognition method that is implemented by an image retrieval system to identify candidate images in a collection that are labeled with the indexing data 22. In accordance with this method, features are extracted from a face region and an associated auxiliary identification region of a query image (FIG. 9, block 100). The face region and the auxiliary identification region may be determined using any of the methods described above in §§ II.B and II.C. A respective distance feature vector is determined between the query image and each of the candidate images in the collection based on the features of the query image and the corresponding features of the candidate images (FIG. 9, block 102).

The candidate images are classified into one of a matching face class and a non-matching face class based on the distance feature vectors (FIG. 9, block 104).

In some embodiments, the members of the matching face class correspond to ones of the candidate images that have distance feature vectors that are below a threshold distance, whereas the members of the non-matching face class are at or above the threshold distance. In some embodiments, the candidate images are classified by a binary classifier, which maps each distance feature vector to one of the matching face class and the non-matching face class. The binary classifier may be built in accordance with any type of classifier inducing process including, but not limited to, machine learning techniques (e.g., boosted cascade classifiers, support vector machines, and multi-layer perceptrons) that build the classifiers using training sets of labeled images containing faces of one or more persons.

V. Conclusion

The embodiments that are described in detail herein recognize persons in images based on features that are extracted from facial regions and auxiliary identification regions of the images. In many application environments, especially personal image collections, these embodiments are expected to achieve improved recognition results even with respect to non-frontal images of faces and poorly registered facial images.

Other embodiments are within the scope of the claims.

What is claimed is:

1. A method, comprising:
   detecting in an input image a face region containing at least a portion of a person's face;
   identifying in the input image an auxiliary identification region outside the face region;
   determining facial features characterizing the face region;
   calculating auxiliary identification features characterizing the auxiliary identification region;
   deriving an indexing datum from the facial features and the auxiliary identification features; and
   storing the indexing datum in association with the input image;

wherein the detecting, the identifying, the determining, the calculating, the deriving, and the storing are performed by computing hardware.

2. The method of claim 1, wherein the identifying comprises selecting a region of the input image below and adjacent to the face region as the auxiliary identification region.

3. The method of claim 1, wherein the identifying comprises selecting a region of the input image surrounding the face region as the auxiliary identification region.

4. The method of claim 1, wherein the identifying comprises determining dimensions of the auxiliary identification region as a function of corresponding dimensions of the face region.

5. The method of claim 1, wherein the calculating comprises calculating one or more photometric invariant features characterizing the auxiliary identification region.

6. The method of claim 1, further comprising color normalizing the auxiliary identification region before calculating the auxiliary identification features.

7. The method of claim 6, wherein the color normalizing comprises determining a transform mapping the face region to a reference color space, and applying the transform to the auxiliary identification region to obtain a normalized auxiliary identification region in the reference color.

8. The method of claim 6, wherein the calculating comprises calculating one or more color features from the color normalized auxiliary identification region.

9. The method of claim 6, wherein the calculating comprises calculating one or more texture features from the color normalized auxiliary identification region.

10. The method of claim 1, further comprising computing one or more measures of similarity between the stored indexing datum and one or more indexing data determined for respective candidate images in a collection, and selecting one or more of the candidate images based on the computed similarity measures.

11. A computer-readable medium comprising machine-readable instructions that, when executed by a machine cause the machine to perform operations comprising:
    detecting in an input image a face region containing at least a portion of a person's face;
    identifying in the input image an auxiliary identification region outside the face region;
    determining facial features characterizing the face region;
    calculating auxiliary identification features characterizing the auxiliary identification region;
    deriving an indexing datum from the facial features and the auxiliary identification features; and
    storing the indexing datum in association with the input image.

12. The computer-readable medium of claim 11, wherein the machine-readable instructions cause the machine to select a region of the input image below and adjacent to the face region as the auxiliary identification region.

13. The computer-readable medium of claim 11, wherein the machine-readable instructions cause the machine to select a region of the input image surrounding the face region as the auxiliary identification region.

14. The computer-readable medium of claim 11, wherein the machine-readable instructions cause the machine to determine dimensions of the auxiliary identification region as a function of corresponding dimensions of the face region.

15. The computer-readable medium of claim 11, wherein the machine-readable instructions cause the machine to calculate one or more photometric invariant features characterizing the auxiliary identification region.

16. The computer-readable medium of claim 11, wherein the machine-readable instructions cause the machine to color normalize the auxiliary identification region before calculating the auxiliary identification features.

17. The computer-readable medium of claim 16, wherein the machine-readable instructions cause the machine to determine a transform mapping the face region to a reference color space, and applying the transform to the auxiliary identification region to obtain a normalized auxiliary identification region in the reference color.

18. The computer-readable medium of claim 16, wherein the machine-readable instructions cause the machine to calculate one or more color features from the color normalized auxiliary identification region.

19. The computer-readable medium of claim 16, wherein the machine-readable instructions cause the machine to calculate one or more texture features from the color normalized auxiliary identification region.

20. A system, comprising:
    computing hardware operable to perform operations comprising
        detecting in an input image a face region containing at least a portion of a person's face;
        identifying in the input image an auxiliary identification region outside the face region;
        determining facial features characterizing the face region and calculate auxiliary identification features characterizing the auxiliary identification region; and
        deriving an indexing datum from the facial features and the auxiliary identification features, and to store the indexing datum in association with the input image.

* * * * *

UNITED STATES PATENT AND TRADEMARK OFFICE
CERTIFICATE OF CORRECTION

PATENT NO. : 7,689,011 B2  
APPLICATION NO. : 11/527239  
DATED : March 23, 2010  
INVENTOR(S) : Huitao Luo et al.

Page 1 of 1

It is certified that error appears in the above-identified patent and that said Letters Patent is hereby corrected as shown below:

In column 10, line 32, delete "face class are at" and insert -- face class correspond to ones of the candidate images that have distance feature vectors that are at --, therefor.

Signed and Sealed this
Twenty-seventh Day of March, 2012

David J. Kappos
*Director of the United States Patent and Trademark Office*